Feb. 21, 1933.    Q. G. NOBLITT ET AL    1,898,462
HEATER
Filed Oct. 27, 1930    2 Sheets-Sheet 1
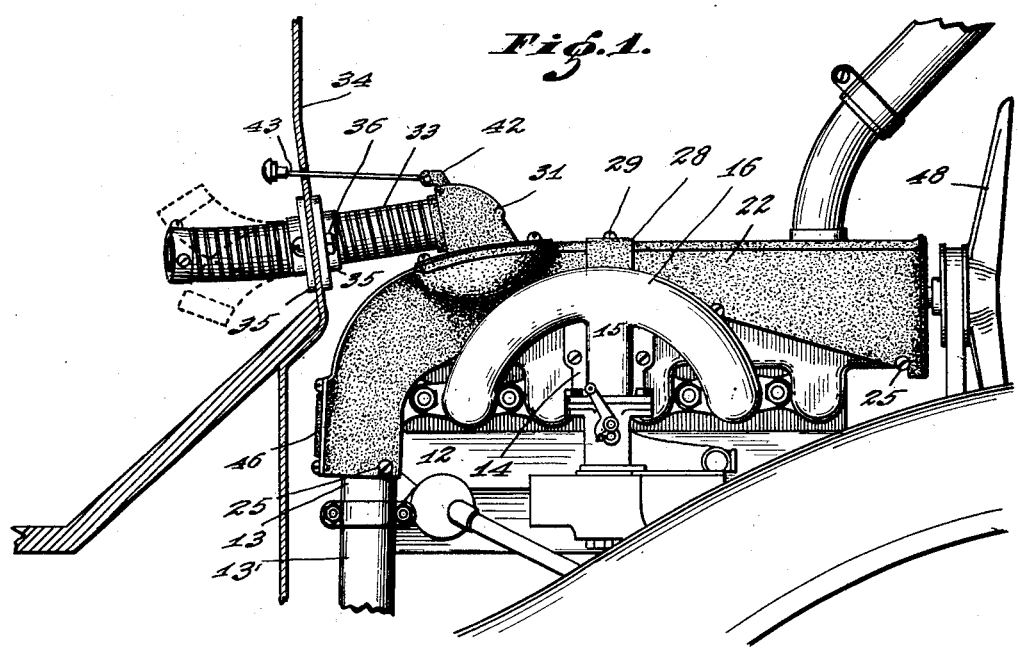
Fig. 1.
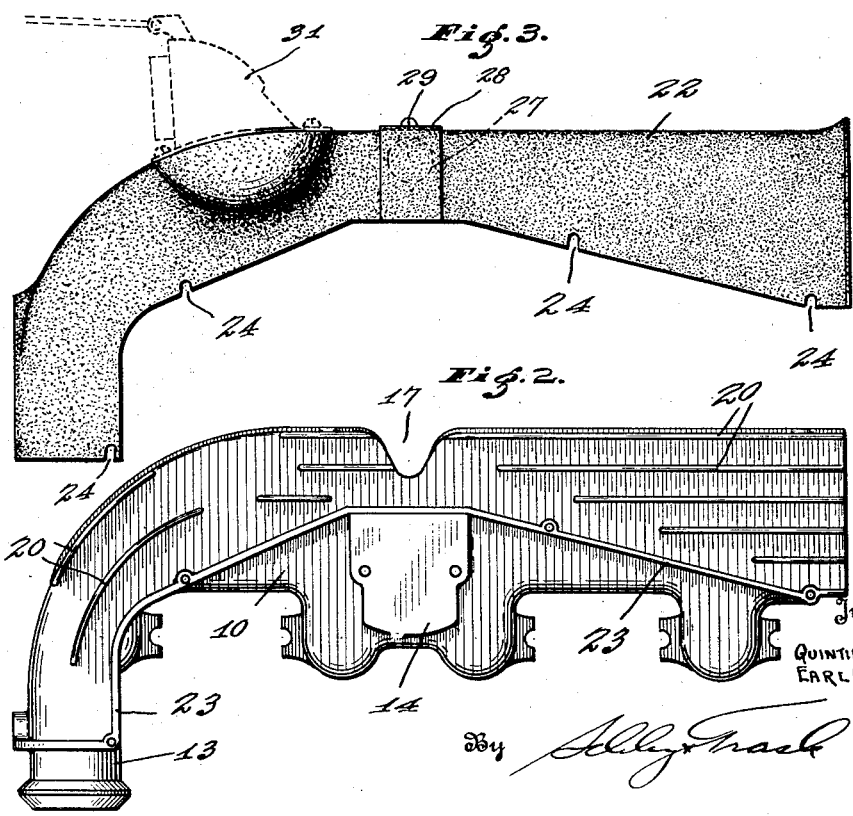
Fig. 3.
Fig. 2.
Inventors
QUINTIN G. NOBLITT
EARL C. BOOTH,
By
Attorneys

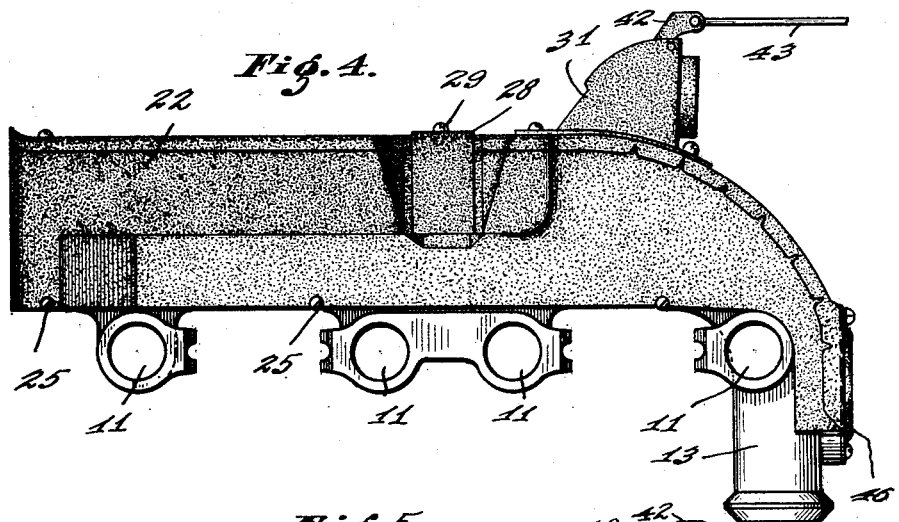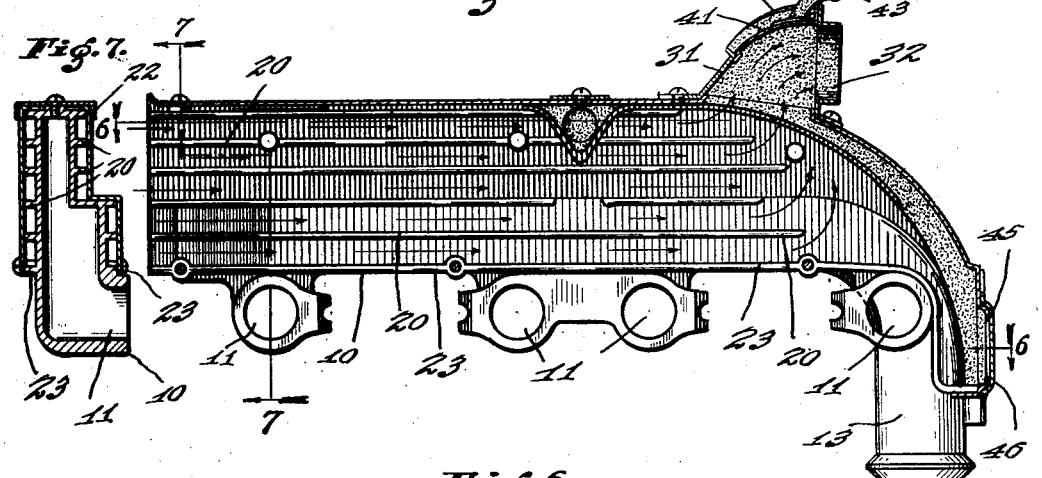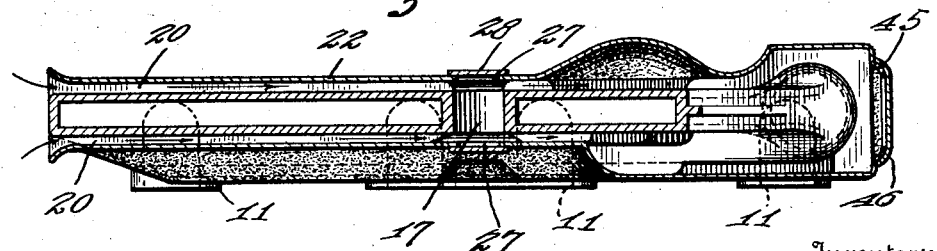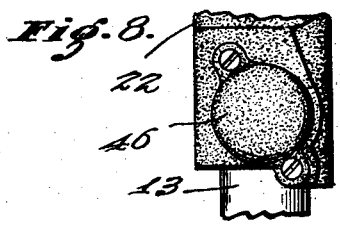

Patented Feb. 21, 1933

1,898,462

UNITED STATES PATENT OFFICE

QUINTIN G. NOBLITT, OF INDIANAPOLIS, AND EARL C. BOOTH, OF COLUMBUS, INDIANA, ASSIGNORS TO NOBLITT-SPARKS INDUSTRIES, INC., OF INDIANAPOLIS, INDIANA, A CORPORATION OF INDIANA

HEATER

Application filed October 27, 1930. Serial No. 491,398.

It is the object of our invention to provide an automobile-body heater which may be employed efficiently to heat the interior of an automobile body by heat derived from the exhaust manifold of the automobile engine. A further object of our invention is to produce such a heater which can be used to heat both the front and rear compartments of the automobile. Another object of our invention is to construct the heater in such a manner that it can readily be removed from or installed in the automobile.

It has previously been proposed to provide a casing surrounding or partially surrounding the exhaust manifold of an automobile engine, to pass air through such casing in contact with the exhaust manifold, and to conduct the air heated by the manifold into the automobile body. One disadvantage of such heaters is that the exhaust manifold with which the engine is provided by the manufacturer does not afford sufficient heating surface to heat adequately the air which passes through the surrounding casing. In carrying out our invention, therefore, we contemplate replacing the standard exhaust manifold with one better adapted to warm air which passes in contact with it. Associated with this exhaust manifold, we provide an enclosing casing which can readily be attached to or removed from the manifold as a unit. The front end of the casing is located near the radiator-cooling fan of the engine in order that air forced rearwardly by such fan may enter the casing and pass rearwardly in contact with the exhaust manifold. Near the rear end of the casing we provide one or more outlets adapted to be connected through suitable conduits with the interior of the automobile body.

The accompanying drawings illustrate our invention: Fig. 1 is an elevation of the engine of a Ford automobile showing our heater installed thereon; Fig. 2 is a side elevation of our improved exhaust manifold; Fig. 3 is a side elevation of the manifold-casing removed from association with the manifold; Fig. 4 is a side elevation of the manifold and manifold-casing assembly as it would appear from the side adjacent the engine; Fig. 5 is a view similar to Fig. 4, but showing the manifold-casing in section; Fig. 6 is a horizontal section on the line 6—6 of Fig. 5; Fig. 7 is a transverse vertical section on the line 7—7 of Fig. 5; and Fig. 8 is a fragmental rear end elevation of the manifold-casing.

The heater illustrated in the accompanying drawings is shown as associated with the engine of a Ford automobile, and it has certain peculiarities of design which fit it for use in such an automobile. Our invention, however, is not limited in its application to a Ford automobile but may with obvious modification be readily adapted for use on other types of automobiles.

As previously stated, we prefer to employ with our heater a special exhaust manifold which will be more efficient in heating air passing in contact with it than is the manifold supplied by the manufacturer. The body 10 of our exhaust manifold is provided along its lower edge with ports 11 adapted when the manifold is in place to be respectively in line with the exhaust ports of the engine 12. The body 10 is shaped to provide a greater exterior area than is possessed by the standard Ford manifold. To this end, it is of larger cross-sectional area, of greater height, and extends forwardly from the exhaust port of the front cylinder. At its rear end, the manifold terminates in a downwardly directed passage 13 adapted to be connected in the usual manner to a conduit 13' which conducts the exhaust gases rearwardly to the usual muffler.

Our exhaust manifold is so constructed that it can take the place of the standard manifold without interfering with other parts of the engine and without the necessity for changing any other parts of the engine. On its outer face, our manifold, like the standard manifold, is provided with a faced boss 14 to which the mixture-heating header 15 of the intake manifold 16 is secured. In addition, the upper edge of the exhaust manifold above the boss 14 is provided with a transversely extending notch or groove 17 in order that the manifold may not interfere with access to certain parts of the Ford engine which may require adjustment.

The inner and outer exterior faces of the manifold are provided with longitudinally extending heat-radiating fins or ribs 20, the purpose of which is to increase the heat-radiating surface of the manifold in order to heat more efficiently the air which passes in contact with it.

The casing 22 which surrounds the exhaust manifold 10 and forms a passage for the air which is to be heated is conveniently formed of sheet-metal and is so shaped that it can be placed upon or removed from the manifold as a unit without distortion. Preferably, this casing is formed of separate inner and outer side walls and a top wall having down-bent longitudinal edges which overlap the upper edges of the side walls and are secured thereto as by means of spot-welding. The casing 22 is shaped to conform to the shape of the exhaust manifold, and preferably fits closely against the edges of the ribs or fins 20, as is clear from Fig. 7. At its lower side, the casing 22 is open when removed from the manifold, and the manifold is provided on both sides with flanges 23 which the lower edges of the casing 22 overlie when the casing is in place. The flange 23 on the outer face of the manifold passes above the faced boss 14 in order that the casing will not interfere with the attachment of the intake manifold. The flange 23 serves to close the otherwise open lower edges of the air passage between the casing and manifold. The lower edge of the outer side of the casing 22 is provided at intervals with notches 24 for the reception of screws 25 screw-threadedly mounted in or adjacent to the flanges 23.

In line with the notch or groove 17 in the manifold 10, the side walls of the casing 22 are provided with holes 27 in order to afford access to certain engine parts which may require adjustment. Normally, these holes are closed by a cover 28 which comprises a U-shaped strip of sheet-metal the parallel legs of which overlie the sides of the casing 22 and cover the holes 27. The cover 28 may be held in place by means of a screw 29 which passes through the intermediate leg of the cover into the top of the casing 22, as is clear from Figs. 3 and 5.

Near the rear end of the casing 22, its top is provided with an opening communicating with a valve housing 31. The valve housing 31 is provided with a rearwardly directed opening 32 communicating with a conduit 33 which extends rearwardly through the dash 34 of the automobile. The conduit 33 may be held in place by means of collars 35 which closely surround the conduit and which are located on opposite sides of the dash 34, these collars being secured together by means of bolts 36. The conduit 33 may be of a flexible nature and may project for a distance rearwardly beyond the dash 34 in order that this projecting end may be bent to direct in any desired direction the heated air which is discharged from the conduit.

In addition to the rearwardly directed opening 32 through which hot air passes into the conduit 33, the valve housing 31 is also provided with an upwardly directed opening 40. A valve 41 pivotally mounted on a transverse axis near the top of the valve housing 31 may be swung about its axis between two positions in one of which (shown in Fig. 5) it closes the opening 40 and in the other of which it closes the opening 32. The valve 41 has rigid with it an arm 42 connected to an operating rod 43 which extends rearwardly through the dash 34 in order that the position of the valve 41 may be controlled from within the automobile body.

In addition to the hot-air outlet provided through the valve housing 31, we prefer to provide an additional hot-air outlet. In the arrangement shown in the drawings, this additional hot-air outlet 45 is located at the extreme rear end of the casing 22 adjacent the discharge passage 13 of the manifold. The opening 45 may either be covered by a cover plate 46 or may be connected with a conduit (not shown) similar to the conduit 33 and leading to the rear compartment of the automobile body.

The manifold 10 is so shaped that its front end lies closely in rear of the fan 48 of the engine cooling system. The front end of the casing 22 is open, and is conveniently bell-mouthed as indicated in order to facilitate the entrance into the space between the casing and the manifold of air forced rearwardly by the fan 48. The air which thus enters the casing 22 passes rearwardly in close contact with the manifold 10 and heat-radiating fins 20, by which it is heated. The path followed by the heated air as it approaches the rear end of the casing 22 depends upon the position of the valve 41 and upon whether or not a conduit is provided leading from the second air-discharge opening 45. If there is no conduit associated with the opening 45, such opening will be covered by the cover plate 46, and all the heated air will pass outwardly through the valve housing 31. If the valve 41 is in the position illustrated in Fig. 5, in which it closes the opening 40, all the heated air will be directed rearwardly through the conduit 33 and into the automobile body. If the valve 41 is moved to close the opening 32, the heated air will find an outlet through the opening 40, and will not pass into the interior of the automobile body.

If an air conduit is connected to the second air-discharge opening 45, the air discharge from the casing will follow a branched path, some of it flowing through the valve housing 31 and the remainder through the opening 45 and the conduit leading therefrom. In order to prevent too great a discharge of air through the valve housing 31 when an air conduit is connected to the opening 45, some of the heat-radiating fins 20, such as the first and third from the bottom in Fig. 5, extend rearwardly past the opening into the valve housing 31 and direct air toward the opening 45.

We have found the heater described to be remarkably efficient and capable of adequately heating an automobile body in the coldest weather. Because of the arrangement of the heat-radiating fins 20, the air heated in the casing 22 may be divided between the front and rear compartments of the automobile body. Because of the simplicity of construction, the heater can be made to sell at a comparatively low price. Further, since the casing 22 is a unitary structure, and since its lower side is closed by the flange 23 on the manifold, it can readily be removed as a unit, merely by loosening the screws 25 which normally serve to hold it in place.

We claim as our invention:

1. A heater for heating the interior of an automobile body by heat derived from the automobile engine, comprising an exhaust-manifold for said engine, said manifold being provided on the outside thereof with longitudinally extending heat-radiating fins, a casing formed to enclose said manifold partially and to fit against the outer edges of said fins, the front end of said casing being open and disposed in position to receive air from the fan of the engine cooling system, said casing being provided with two openings near its rear end for permitting the escape of air heated by contact with the manifold and its fins, said openings being spaced from each other longitudinally of said casing, and one or more of said fins extending rearwardly past the forward edge of the forwardmost of said openings to deflect heated air toward the rearwardmost opening.

2. A heater for heating the interior of an automobile body by heat derived from the automobile engine, comprising an exhaust-manifold for said engine, said manifold being provided on the outside thereof with longitudinally extending heat-radiating fins, a casing formed to enclose said manifold partially, the front end of said casing being open and disposed in position to receive air from the fan of the engine cooling system, said casing being provided with two openings near its rear end for permitting the escape of air heated by contact with the manifold and its fins, said openings being spaced from each other longitudinally of said casing, and one or more of said fins extending rearwardly past the forward edge of the forwardmost of said openings to deflect heated air toward the rearwardmost opening.

3. A heater for heating the interior of an automobile body by heat derived from the automobile engine, comprising an exhaust-manifold for said engine, an open-bottomed removable casing for partially enclosing said manifold, said casing being spaced from the manifold, said manifold being provided with a flange received within said casing when the casing is in place and co-operating with the casing to define a longitudinally extending air passage, said casing being open at its front end for the admission of air and having at its rear end one or more air discharge openings, said flange being received within the lower edge of the casing, the lower edge of the casing being provided with one or more notches, and screws mounted in said manifold in position to be received in said notches when the casing is in place.

4. A heater for heating the interior of an automobile body by heat derived from the automobile engine, comprising an exhaust manifold for the engine, a casing for partially enclosing said manifold, said casing being spaced from said manifold to define an air passage open at its front end, said casing being provided in its upper surface and near its rear end with an opening, a housing covering said opening, said housing being provided with two spaced openings, a conduit for connecting one of said openings with the interior of the automobile body, and a valve member pivotally mounted in said housing and movable about its axis to close either of said openings.

5. A heater for heating the interior of an automobile body by heat derived from the automobile engine, comprising an exhaust manifold for the engine, a casing for partially enclosing said manifold, said casing being spaced from said manifold to define an air passage open at its front end, said casing being provided in its upper surface and near its rear end with an opening, a housing covering said opening, said housing being provided with two spaced openings a conduit for connecting one of said openings with the interior of the automobile body, and a valve member mounted in said housing and movable to close either of said openings.

6. A heater for heating the interior of an automobile body by heat derived from the automobile engine comprising an exhaust-manifold for said engine, said manifold having a substantially horizontal main portion and at its rear end a downwardly inclined portion, a casing co-operating with said manifold to define a passage through which air may pass in contact with said manifold to be heated thereby, the front end of said casing being open and disposed in position to receive air, said casing being provided near its rear end with two air-discharge openings for permitting the passage of heated air, one of said openings being located near the top of the casing adjacent the rear end of the main portion of the manifold, and the other of said openings being located adjacent the downwardly inclined portion of said manifold.

In witness whereof, we have hereunto set our hands at Indianapolis, Indiana, this 17th day of October, A. D. one thousand nine hundred and thirty.

QUINTIN G. NOBLITT.
EARL C. BOOTH.